United States Patent
Chiba et al.

(10) Patent No.: US 9,238,272 B2
(45) Date of Patent: Jan. 19, 2016

(54) DRILL

(75) Inventors: Yasushi Chiba, Toyota (JP); Takatoshi Yabuta, Miyoshi (JP); Masayuki Nakamura, Toyota (JP); Yumi Nakamura, legal representative, Toyota (JP); Makoto Yoshikuni, Toyota (JP); Takashi Nakayama, Tenshin (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 239 days.

(21) Appl. No.: 13/996,929

(22) PCT Filed: Dec. 28, 2011

(86) PCT No.: PCT/JP2011/080374
§ 371 (c)(1),
(2), (4) Date: Sep. 17, 2013

(87) PCT Pub. No.: WO2012/091085
PCT Pub. Date: Jul. 5, 2012

(65) Prior Publication Data
US 2014/0003877 A1 Jan. 2, 2014

(30) Foreign Application Priority Data
Dec. 28, 2010 (JP) ................. 2010-292004

(51) Int. Cl.
*B23B 51/02* (2006.01)
*B23B 51/00* (2006.01)

(52) U.S. Cl.
CPC ............. *B23B 51/00* (2013.01); *B23B 51/02* (2013.01); *B23B 2251/18* (2013.01); *B23B 2251/46* (2013.01); *B23B 2265/324* (2013.01); *B23B 2265/326* (2013.01); *Y10T 408/89* (2015.01);
(Continued)

(58) Field of Classification Search
CPC .............. Y10T 408/909; Y10T 408/9095; Y10T 408/899; B23B 51/0081; B23B 2231/2008; B23B 2231/2029; B23B 2231/2035; B23B 2251/085; B23B 2251/202; B23B 2251/205
USPC ............................ 408/227, 229, 211
See application file for complete search history.

(56) References Cited

U.S. PATENT DOCUMENTS 2,715,772 A * 8/1955 Fritz ............................. 433/165
4,565,471 A * 1/1986 Negishi ................. B23B 51/02
                                                  408/204
4,594,034 A * 6/1986 Maier .......................... 408/230
(Continued)

FOREIGN PATENT DOCUMENTS

JP    53-090291 U    7/1978
JP    61-068811 U    5/1986
(Continued)

Primary Examiner — Daniel Howell
Assistant Examiner — Yasir Diab
(74) Attorney, Agent, or Firm — Sughrue Mion, PLLC

(57) ABSTRACT

TASK
An inexpensive drill with high processing accuracy is provided.
MEANS FOR SOLVING THE PROBLEM
A chisel edge 11 of a tip 12 is removed, and a pyramid 1 is formed in that part, in which an inclination angle θ1 of each edge 4 extending from an apex P relative to a center line of the drill CL is formed to be larger than an angle θ2 that is one-half of a drill tip angle θ0, and so chisel steps are resolved and stable cutting becomes possible, thereby improving hole accuracy. Also, it is possible to form the pyramid 1 by grinding a tip of an existing drill by a grinder, so that a drill can be realized at a low cost.

2 Claims, 8 Drawing Sheets

(52) U.S. Cl.
CPC ........ *Y10T 408/899* (2015.01); *Y10T 408/9097* (2015.01)

(56) References Cited

U.S. PATENT DOCUMENTS

| | | | |
|---|---|---|---|
| 5,236,291 A * | 8/1993 | Agapiou et al. | 408/211 |
| 5,664,914 A * | 9/1997 | Taniguchi | B23B 51/00 408/199 |
| 6,257,889 B1 * | 7/2001 | Boston | 433/165 |
| 2002/0044844 A1 * | 4/2002 | Andronica | 408/199 |
| 2010/0296887 A1 * | 11/2010 | Moseley et al. | 408/227 |
| 2010/0322726 A1 * | 12/2010 | Glimpel et al. | 408/57 |

FOREIGN PATENT DOCUMENTS

| | | | |
|---|---|---|---|
| JP | 569214 | A | 3/1993 |
| JP | 05-096414 | A | 4/1993 |
| JP | 675612 | U | 10/1994 |
| JP | 2002-126925 | A | 5/2002 |
| JP | 2002-200510 | A | 7/2002 |
| JP | 2003-326410 | A | 11/2003 |
| JP | 2003-334710 | A | 11/2003 |
| JP | 2004-025383 | A | 1/2004 |
| JP | 2007-185719 | A | 7/2007 |
| JP | 2007-301706 | A | 11/2007 |
| JP | 2010036295 | A * | 2/2010 |

* cited by examiner

F I G. 3
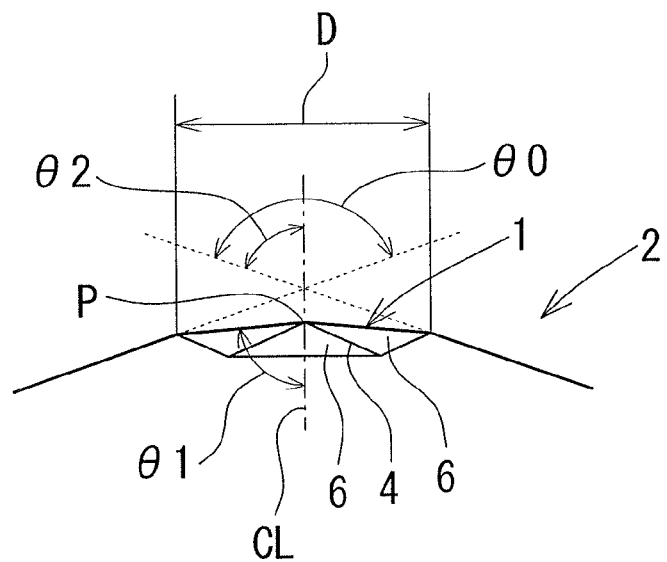
F I G. 4
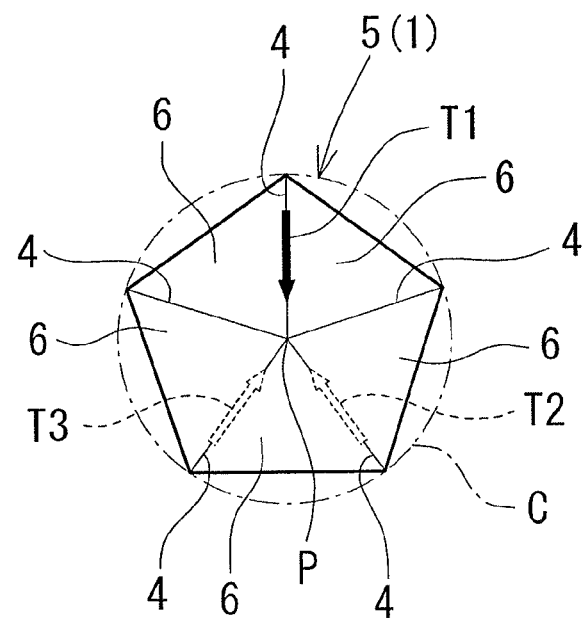

F I G. 5 (a)
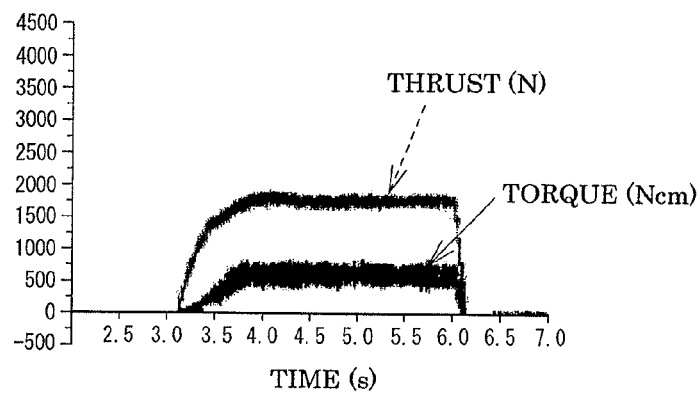
F I G. 5 (b)
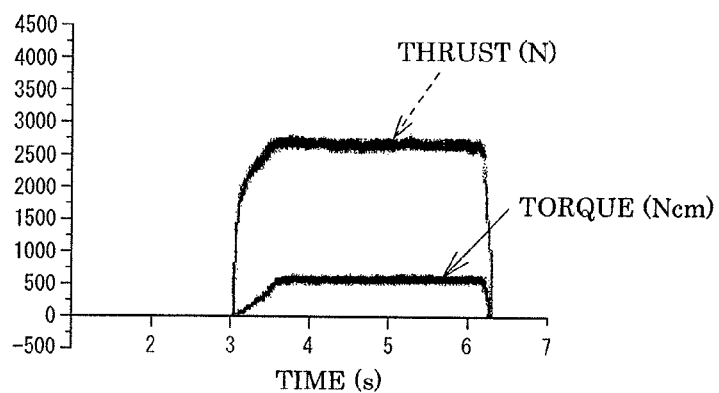
F I G. 5 (c)
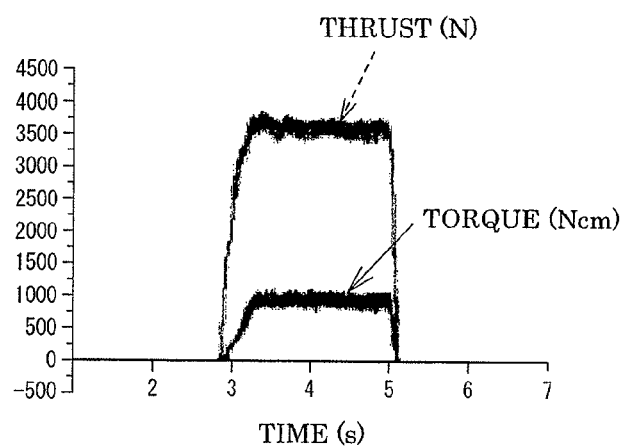

DRILL

CROSS REFERENCE TO RELATED APPLICATIONS

This application is a National Stage of International Application No. PCT/JP2011/080374, filed on Dec. 28, 2011, claiming priority from Japanese Patent Application No. 2010-292004, filed Dec. 28, 2010, the contents of all of which are incorporated herein by reference in their entirety.

TECHNICAL FIELD

The present invention relates to a drill that is used for, for example, drilling in machining processes.

BACKGROUND ART

As a drill used for, for example, drilling in machining processes, there is known a drill having a chisel edge formed in a tip of the drill. Since the chisel edge has a wedge shape with a very small rake angle and a small chip pocket, a very large thrust load is generated, compared to a cutting edge. In a drill having a chisel edge, since components of force in directions orthogonal to a thrust are generated, biting capability and centering capability are reduced. Therefore, a technique to improve chip discharging capability from a center part, or so-called thinning, is conducted by shortening the chisel edge to add a rake angle. However, when the chisel edge is shortened by thinning, there is a problem that rigidity of an edge is reduced. Also, since the chisel edge still remains, vibration and whirling of the drill is not avoidable, and there is a limit in hole accuracy.

Therefore, Patent Document 1 disclosed a technique to prevent components of force in directions orthogonal to a thrust of a drill from being generated by providing a conical projecting part integrally with a body at a chisel position of the drill. However, in the drill, a cutting edge is not formed in the conical projecting part. Thus, centering capability is obtained, but an enormous thrust load is generated, which is likely to cause buckling. In addition, since a distance from a tip end of the drill, namely, an apex of the conical projecting part, to a shoulder (i.e., a tip length) is extended, a region where process is unstably done, that is, a distance until the whole tip of the drill enters a work piece, is increased, thereby deteriorating hole accuracy. Moreover, since the conical projecting part is added to the tip of the drill, it is not possible to manufacture the drill by existing drill grinding or the like, thereby causing an increase in manufacturing costs.

RELATED ART DOCUMENTS

Patent Documents

[Patent Document 1] Japanese Patent Application Publication No. 2002-200510 (JP 2002-200510 A)

SUMMARY OF THE INVENTION

Problems to be Solved by the Invention

The present invention is thus accomplished in consideration of the above situation, and aims to provide a drill that realizes high processing accuracy and is inexpensive.

Means for Solving the Problems

In order to resolve the above problem, a drill of the present invention is characterized by including a pyramid in a tip of the drill, in which an apex of the pyramid is located on a center line of the drill, and an inclination angle of each edge extending from the apex relative to the center line of the drill is larger than an angle that is one-half of a tip angle of the drill, and each pyramid surface of the pyramid is formed into a concave shape.

(Exemplary Forms of Invention)

Hereinafter, exemplary forms of inventions considered claimable in the present application (referred to as claimable inventions below) will be described. The forms are divided into items similar to the claims, and each item is assigned with a number and may cite the number of other items as necessary. This format is only intended to facilitate understanding of the claimable inventions, and the combinations of structural elements that constitute the claimable inventions are not limited to those described in the following items. In other words, the claimable inventions should be interpreted in consideration of the descriptions accompanying each item, the descriptions of the embodiments, and the like. Forms that add other structural elements to or omit structural elements from the forms in the items are also considered to be forms of the claimable inventions, provided that they conform to such interpretations.

In the following items, items (1) to (3) correspond to the claims 1 to 3, respectively.

(1) A drill is characterized by including a pyramid in a tip of the drill, in which an apex of the pyramid is located on a center line of the drill, and an inclination angle of each edge extending from the apex relative to the center line of the drill is larger than an angle that is one-half of a tip angle of the drill, and each pyramid surface of the pyramid is formed into a concave shape.

With the drill stated in this item, it is possible to remove the chisel edge. Thus, whirling of the drill due to the chisel edge, or so-called chisel steps, is resolved, thereby making it possible to perform cutting in a stabilized manner and to improve hole accuracy.

The inclination angle of each of the edges extending from the apex of the pyramid (hereinafter, simply referred to as each edge) relative to the center line of the drill is formed to be larger than an angle that is one-half of the tip angle of the drill, namely, an inclination angle of a cutting edge relative to the center line of the drill. Therefore, a distance from a tip end of the drill (the apex of the pyramid in the present form) to a shoulder (i.e., a tip length) is reduced. Therefore, the drill is stabilized earlier, and hole accuracy is thus improved. Since a relatively inexpensive drill with a smaller number of blades (for example, two blades) is able to realize highly accurate processing, it is not necessary to use a relatively expensive drill with a larger number of blades (for example, three blades, and four blades) in order to enhance hole accuracy, which reduces manufacturing costs of a processed product. In addition, since it is not required to change processing conditions (a machining program of an NC unit), it is possible to prevent an increase in man-hours.

Since it is possible to form the pyramid by grinding a tip of an existing drill, an increase in manufacturing costs of the drill is inhibited. In addition, less effort is required for readjustment of re-grinding conditions in a drill grinder, thereby preventing an increase in man-hours for regrinding.

Further, since each pyramid surface of the pyramid is formed into a concave shape, friction between each of the pyramid surfaces of the pyramid and a work piece during processing can be reduced. Thus, an increase in cutting temperature due to friction can be prevented, thereby preventing wear of the pyramid.

The number of blades is not limited for the drill covered by the form in this item, and the form may be adopted to, for example, a two-blade drill, a three-blade drill, and a four-blade drill.

For the pyramid, a pentagonal pyramid, a hexagonal pyramid, a heptagonal pyramid and so on may be selected as appropriate.

It is preferred that the inclination angle of each of the edges extending from the apex of the pyramid relative to the center line of the drill be larger by approximately 15° than the angle that is one-half of the drill tip angle. For example, when the drill tip angle is 118°, it is preferred that the inclination angle of each of the edges extending from the apex of the pyramid relative to the center line of the drill be set to approximately 74°.

When a size of a bottom face of the pyramid is defined as a diameter of a circle with which a regular polygon approximating the bottom face of the pyramid is in contact, it is preferred that the size of the bottom face of the pyramid be 5 to 6% of a diameter of the drill. For example, when the diameter of the drill is 10 mm, it is preferred that the size of the bottom face of the pyramid be set to 0.5 to 0.6 mm.

The convex shape may be formed by configuring each pyramid surface of the pyramid with a curved surface, or by providing a groove in each of the pyramid surfaces made of flat surfaces, the groove extending radially from the apex and having a V-shaped cross section. In this case, the groove may be formed so that a groove width increases linearly from the apex.

(2) The drill according to item (1) is characterized in that each of the edges of the pyramid is formed of a curved line.

With the drill stated in this item, since a contact length between each of the edges of the pyramid and a work piece during processing, in other words, a length of a cutting edge of the pyramid is increased compared to a case where each of the edges of the pyramid is formed of a straight line, loads are dispersed and sharpness of the cutting edge is improved, thereby inhibiting buckling of the tip end (the pyramid).

In the form of this item, each of the edges of the pyramid may be formed of, for example, a curved line, which is convex in a clockwise direction at its center, viewed along the line of sight in a direction of the center line of the drill.

(3) The drill according to item (1) or (2) is characterized in that the number of the edges extending from the apex of the pyramid is an odd number.

With the drill stated in this item, when the number of the edges extending from the apex of the pyramid is five, that is, when the pyramid is a pentagonal pyramid, a component of force in a direction orthogonal to a thrust of the drill, which acts on one of the edges of the pyramid, is able to be received by two edges that face the one edge. This is generally equivalent to that a component of force in a direction orthogonal to the thrust of the drill, which acts on one of the edges of the pyramid, is received by a surface, and behaviors (vibration, whirling, and so on) of the drill are stabilized further, and hole accuracy can be improved, compared to a case where the number of edges extending from the apex of the pyramid is an even number (for example, four edges), that is, a case where a component of force in a direction orthogonal to the thrust of the drill, which acts on one of the edges of the pyramid, is received by only one edge that faces the one edge.

In the form of this item, the number of the edges extending from the apex of the pyramid may be other than five, such as three and seven.

Effects of the Invention

According to the present invention, it is possible to provide a drill that realizes high processing accuracy and is inexpensive.

BRIEF DESCRIPTION OF THE DRAWINGS

FIG. 3 is a view of the pyramid in FIG. 2 along a line of sight in a direction that is orthogonal to the center line of the drill.

FIG. 4 is a view showing a virtual bottom face of the pyramid of the first embodiment, and is a view showing components of force that act on edges of the pyramid in directions orthogonal to a thrust of the drill during processing.

FIG. 5 shows test results of cutting resistance during processing for explaining actions of the first embodiment, in which FIG. 5A shows a test result for a standard two-blade drill, FIG. 5B shows a test result for a two-blade drill having the pyramid of the first embodiment, and FIG. 5C shows a test result of a standard three-blade drill.

DESCRIPTION OF THE REFERENCE NUMERALS

1: Pyramid, 2: Tip, 3: Flank 4: Edge, 5: Bottom face, 6: Pyramid surface, 7: Cutting edge

MODES FOR CARRYING OUT THE INVENTION

First Embodiment

A first embodiment of the present invention will be explained with reference to the accompanying drawings.

Figure 1:
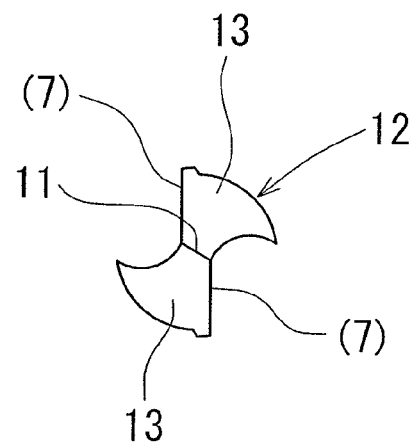
FIG. 1 is a view of a tip of a standard two-blade drill along a line of sight in a direction of a center line of the drill.

Here, a form will be explained in which a pyramid 1 of the present invention is adopted in a part where a chisel edge 11 is formed in a standard drill, in other words, a two-blade drill in which flanks 13 of a tip 12 are re-ground by conical grinding as shown in FIG. 1. The only difference between a drill of the first embodiment and the standard drill shown in FIG. 1 is the part where the chisel edge 11 is formed, and the explanation will be provided only on the part that is different from the standard drill in order to simplify the description.

Figure 2:
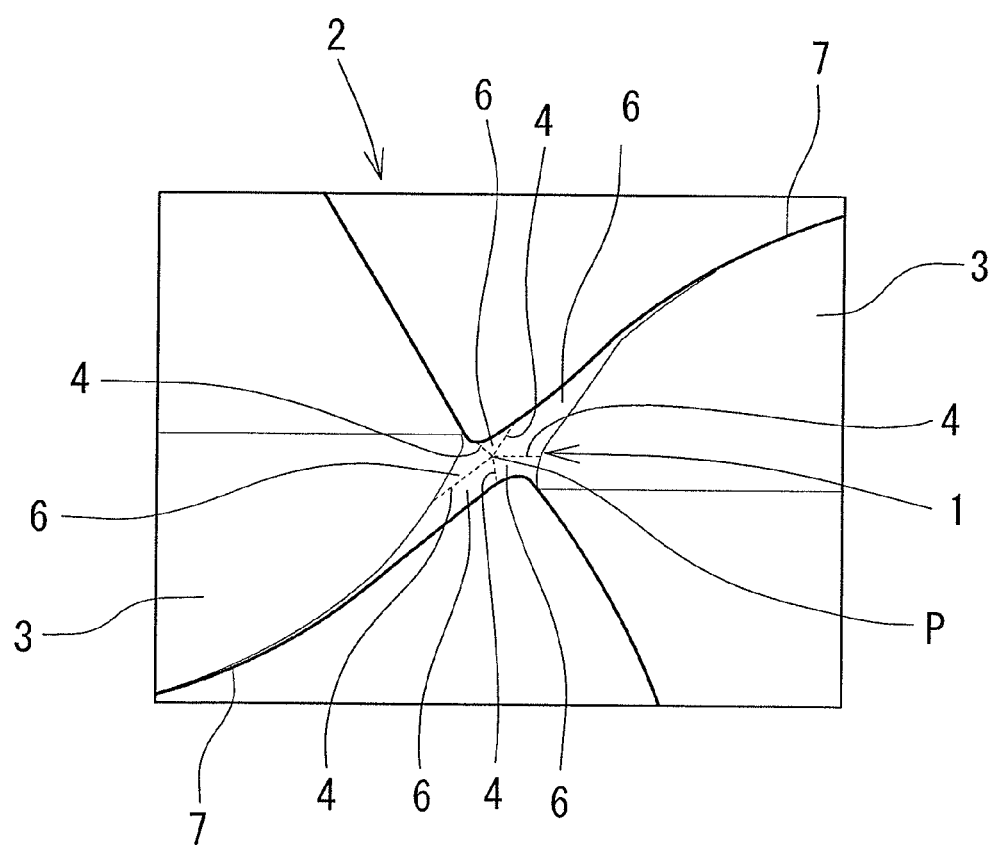
FIG. 2 is a view showing a pyramid of a first embodiment, and is an enlarged view showing a part that is equivalent to a part where a chisel edge is formed in the tip of the drill shown in FIG. 1.

FIG. 2 is an enlarged view showing a part of a tip 2 of the drill of the first embodiment, the part being equivalent to the part where the chisel edge 11 is formed in the tip 12 of the standard drill shown in FIG. 1, and FIG. 3 is a view of the part of the tip 2 along a line of sight in a direction that is orthogonal to a center line of the drill. The pyramid 1 is configured of a pentagonal pyramid in which a center line of the pyramid 1 that passes through an apex P coincides with the center line of the drill CL. In the pyramid 1, a size of a bottom face 5 (a virtual bottom face) shown in FIG. 4, that is, a diameter D of a circle C, with which a regular pentagon formed by the bottom face 5 is in contact, is set to be 5% of a diameter of the drill. Further, in the pyramid 1, an inclination angle θ1 of each edge 4 extending from the apex P relative to the center line of the drill CL is set to be an angle that is larger by 15° than an angle θ2 that is one-half of the drill tip angle θ0.

It is possible to obtain the pyramid 1 by, for example, grinding the tip 12 of the standard drill shown in FIG. 1 by using a drill grinder. Arrangement of the edges 4 of the pyramid 1, that is, pyramid surfaces 6 of the pyramid 1, about the center line of the drill CL may be decided as appropriate depending on the drill to be used.

Next, operations of the drill of the first embodiment will be explained.

In FIG. 5, FIG. 5A shows a test result of cutting resistance during processing with a standard two-blade drill (hereinafter referred to as a standard drill), FIG. 5B shows a test result of cutting resistance during processing with a two-blade drill of the first embodiment having the pyramid 1 (hereinafter, referred to as a drill of the present invention), and FIG. 5C shows a test result of cutting resistance during processing with a three-blade standard drill (hereinafter, referred to as a three-blade drill). The tests were conducted with drills having a diameter of 8 mm, and toque and thrust were measured while blind holes with a depth of 8 mm were being made using the same machining center and cutting oil.

Processing conditions for the standard drill and the drill of the present invention were a cutting speed (V) of 20 m/min and feed (f) of 0.19 mm/rev, and processing conditions for the three-blade drill were a cutting speed (V) of 20 m/min and feed (f) of 0.28 mm/rev.

First of all, the test results will be compared between the drill of the present invention and the standard drill. When a comparison of cutting resistance between the two drills is made, the drill of the present invention has shorter rise times of torque and thrust during processing, in other words, takes less time from start of processing until measured value become stable, than the standard drill. This is considered to be because, in the drill of the present invention, the inclination angle θ1 of each of the edges 4 of the pyramid 1 relative to the center line of the drill CL is formed to be larger than the angle that is one-half of the drill tip angle θ0, in other words, the inclination angle θ2 of a cutting edge 7 to the center line of the drill CL. Thus, in the drill of the present invention, a distance from the tip end of the drill (the apex P of the pyramid 1) to the shoulder (i.e., a tip length) is shorter than that of the standard drill. Therefore, the drill of the present invention is able to be stabilized earlier.

Figure 6A:
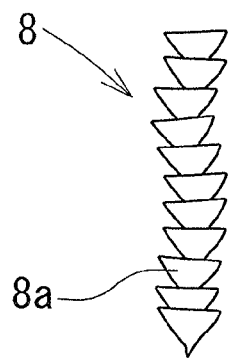
FIG. 6 shows views for explaining the actions of the first embodiment, and for comparing a chip obtained from processing by a two-blade drill having the pyramid of the first embodiment, to a chip obtained from processing by a standard two-blade drill.
Figure 6B:
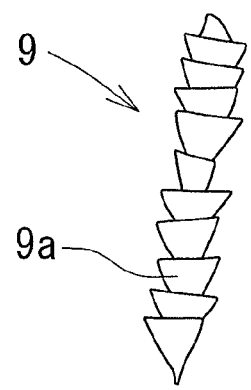

Also, torque amplitude of the drill of the present invention is smaller than that of the standard drill in the entire region (a period from start of processing through an end of processing). In short, the drill of the present invention has small torque variation during processing, which allows smooth cutting with small vibration. This is also evident from a comparison between a chip 8 from the drill of the present invention and a chip 9 from the standard drill shown in FIG. 6. As shown in the drawing, in the chip 8 from the drill of the present invention, conic shapes 8a are formed in an even size and at an even pitch, whereas in the chip 9 from the standard drill, conic shapes 9a have variation in size and pitch. It is also found that variation in torque of the drill of the present invention during processing is smaller than that of the three-blade drill.

In the first embodiment, the number of the edges 4 extending from the apex P of the pyramid 1 are set to an odd number (five edges in the first embodiment). Therefore, a component T1 (a sliding force) in a direction orthogonal to a thrust of the drill, which acts on one of the edges 4 of the pyramid 1, can be received by components T2 and T3 (receiving forces) in directions orthogonal to the thrust of the drill, which act on two of the edges 4 that face the one edge 4 as shown in FIG. 4. Thus, behaviors (vibration, whirling, and so on) of the drill become more stable and hole accuracy can be improved, compared to a case where the number of the edges 4 extending from the apex P of the pyramid 1 is an even number (for example, four edges), i.e., a case where a component T1 (a sliding force) in a direction orthogonal to the thrust of the drill, which acts on one of the edges 4 of the pyramid 1, is received by a component (a receiving force) in a direction orthogonal to the thrust of the drill, which acts only on one of the edges 4 that faces the one edge 4.

In the first embodiment, the following effects are obtained.

According to the first embodiment, the chisel edge 11 in the tip 12 is removed, and the pyramid 1 is formed in that part such that the inclination angle θ1 of each of the edges 4 extending from the apex P relative to the center line of the drill CL is formed to be larger than the angle θ2 that is one-half of the drill tip angle θ0. Therefore, whirling of the drill due to the chisel edge 11, which is so-called chisel steps, is resolved, thereby making it possible to perform cutting in a stabilized manner and to improve hole accuracy.

It also becomes possible to reduce the distance from the tip end of the drill (the apex P of the pyramid 1) to the shoulder (i.e., the tip length) compared to that of the standard drill. As a result, a rise time, in other words, time from start of processing until the drill (cutting resistance) becomes stable, is shortened, and vibration of the drill is reduced (behaviors are stabilized) throughout the processed region, thereby improving hole accuracy.

Further, since the number of the edges 4 extending from the apex P of the pyramid 1 is set to an odd number (five edges in the first embodiment), the component T1 (a sliding force) in a direction orthogonal to the thrust of the drill, which acts on one of the edges 4 of the pyramid 1, can be received by the components T2 and T3 (receiving forces) in directions orthogonal to the thrust of the drill, which act on two of the edges 4 that face the one edge 4. Thus, the behaviors (vibration, whirling, and so on) of the drill become more stable, and hole accuracy can be improved, compared to the case where the number of the edges 4 extending from the apex P of the pyramid 1 is an even number (four edges, for example), i.e., the case where the component T1 (a sliding force) in a direction orthogonal to the thrust of the drill, which acts on one of the edges 4 of the pyramid 1, is received by a component (a receiving force) in a direction orthogonal to the thrust of the drill, which acts only on one of the edges 4 that faces the one edge 4.

Moreover, because highly accurate processing is possible even with an inexpensive two-blade drill, it is not necessary to use a relatively expensive drill with three or more blades in order to improve hole accuracy, thereby reducing running costs of the equipment. In addition, since it is not required to change processing conditions (a machining program of an NC unit), an increase in man-hours can be prevented.

Since the pyramid 1 can be formed by grinding of the tip of the existing drill (the standard drill) with the use of a grinder, formation of the pyramid 1 is easily carried out and a cost increase is inhibited. Moreover, less effort is required for readjustment of re-grinding conditions in the drill grinder, and an increase in man-hours for re-grinding can be prevented.

The first embodiment is not limited to above, and may be configured as follows, for example.

In the first embodiment, the two-blade drill was embodied. However, the number of blades of the drill is not limited; for example, the first embodiment may be adopted to a drill having three or four blades.

In the first embodiment, the pyramid 1 was the pentagonal pyramid. However, a hexagonal pyramid, a heptagonal pyramid, and the like may be selected as the pyramid 1 where appropriate.

Figure 7:
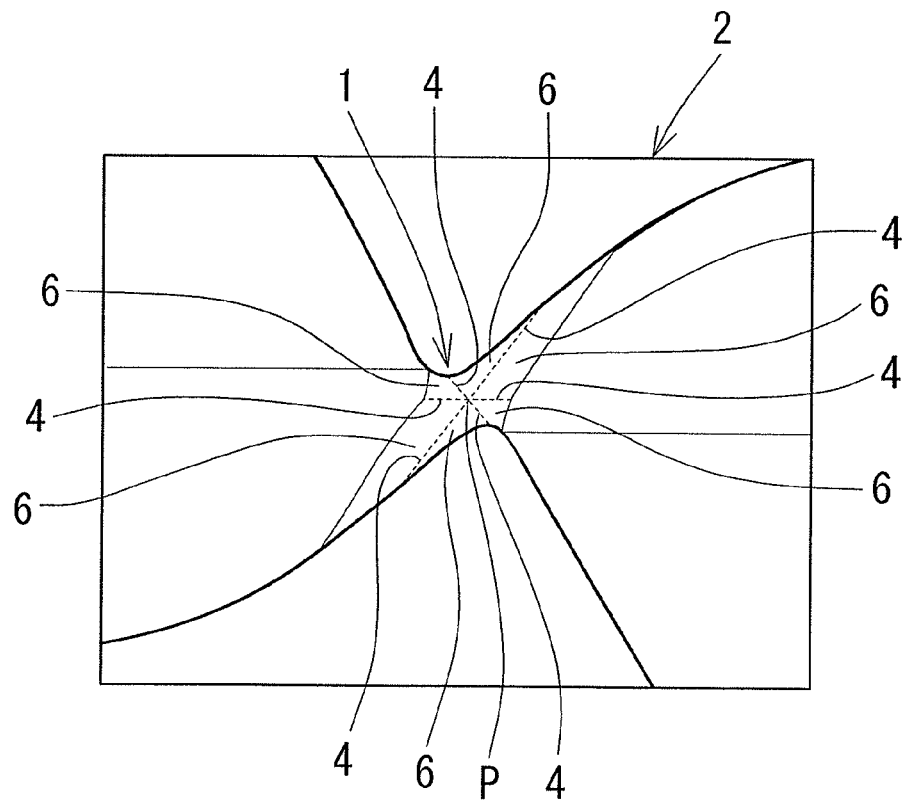
FIG. 7 is a view corresponding to FIG. 2, showing another aspect of the first embodiment where a pyramid with six edges (a hexagonal pyramid) is adopted in a two-blade drill.
Figure 8:
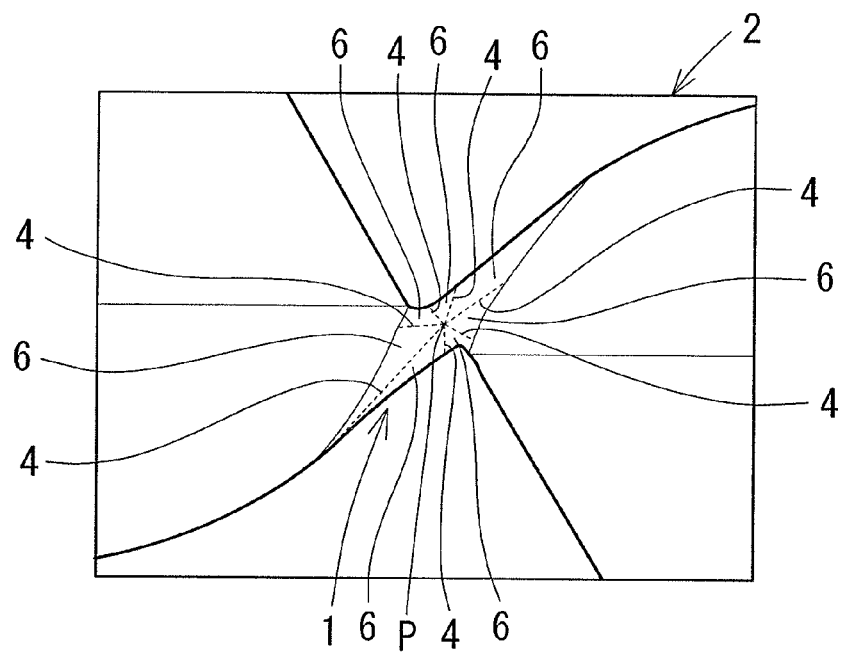
FIG. 8 is a view corresponding to FIG. 2, showing another aspect of the first embodiment where a pyramid having seven edges (a heptagonal pyramid) is adopted in a two-blade drill.
Figure 9:
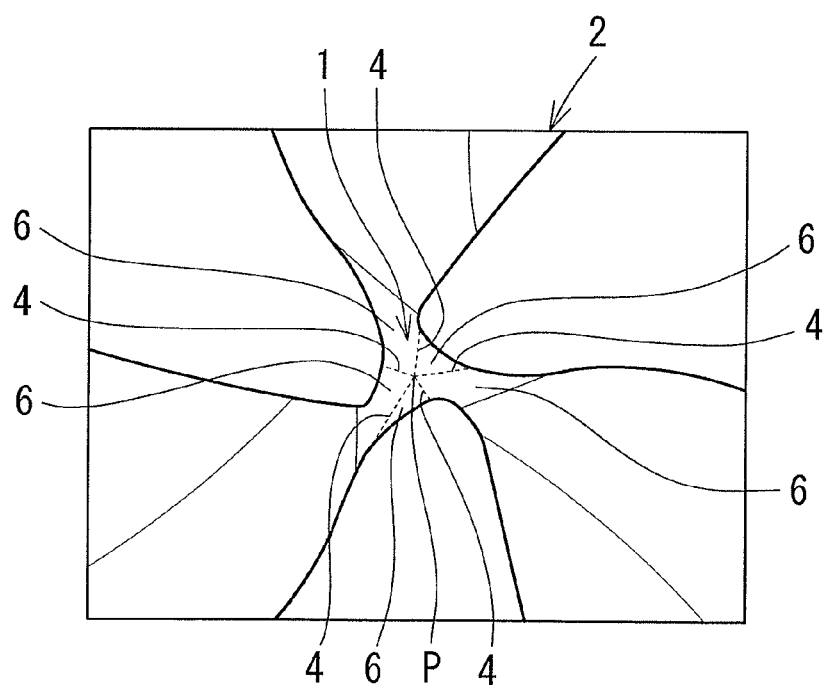
FIG. 9 is a view corresponding to FIG. 2, showing another aspect of the first embodiment where a pyramid with five edges (a pentagonal pyramid) is adopted in a three-blade drill.
Figure 10:
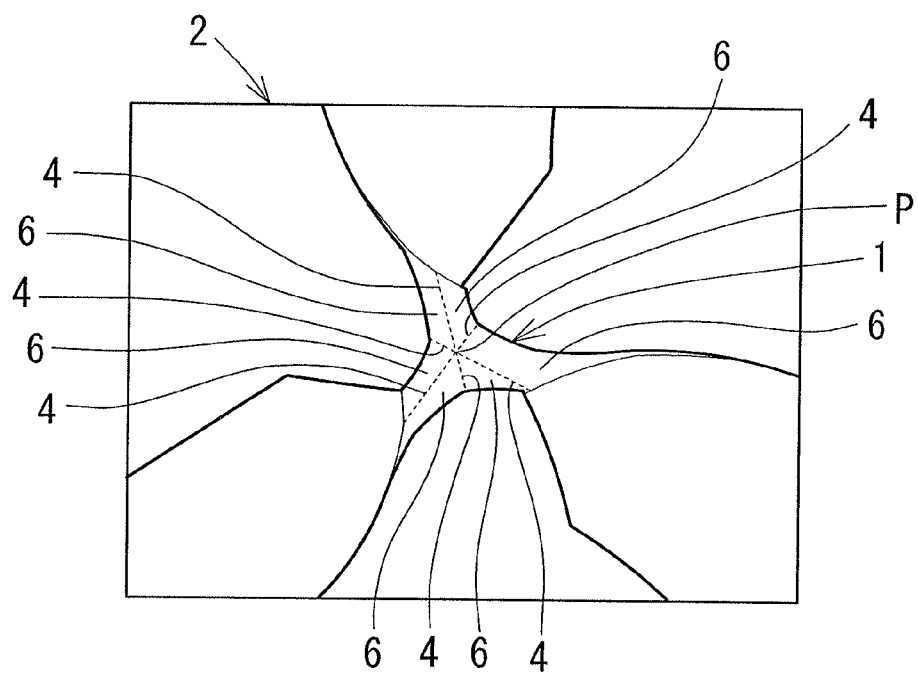
FIG. 10 is a view corresponding to FIG. 2, showing another aspect of the first embodiment where a pyramid with six edges (a hexagonal pyramid) is adopted in a three-blade drill.
Figure 11:
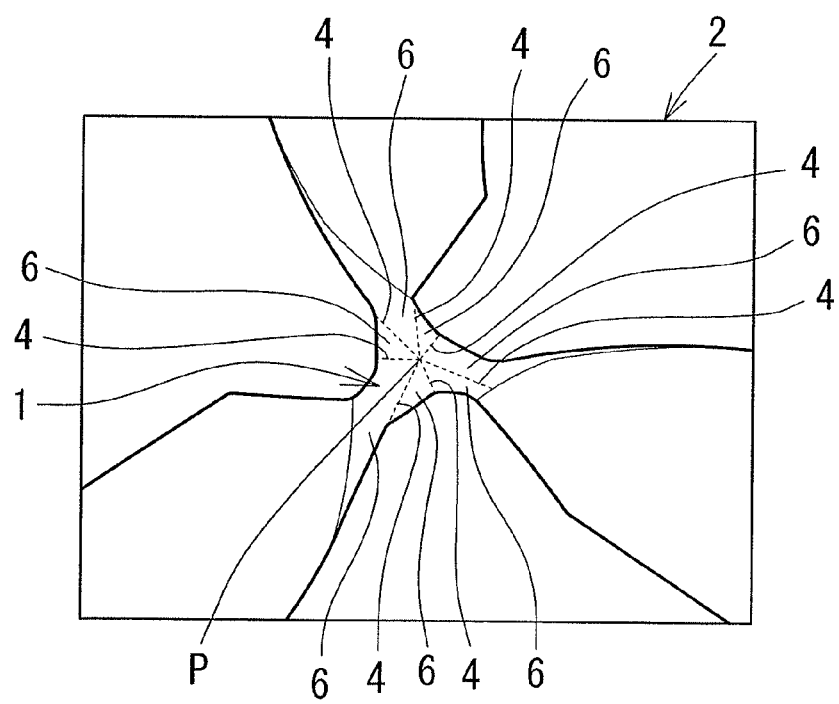
FIG. 11 is a view corresponding to FIG. 2, showing another aspect of the first embodiment where a pyramid with seven edges (a heptagonal pyramid) is adopted in a three-blade drill.

FIG. 7 is a view corresponding to FIG. 2 in the case where a pyramid 1 with six edges (a hexagonal pyramid) is adopted in a two-blade drill, FIG. 8 is a view corresponding to FIG. 2 in the case where a pyramid 1 with seven edges (a heptagonal pyramid) is adopted in two-blade drill, FIG. 9 is a view corresponding to FIG. 2 in the case where a pyramid 1 with five edges (a pentagonal pyramid) is adopted in a three-blade drill, FIG. 10 is a view corresponding to FIG. 2 in the case where a pyramid 1 with six edges (a hexagonal pyramid) is adopted in a three-blade drill, and FIG. 11 is a view corresponding to FIG. 2 in the case where a pyramid 1 with seven edges (a heptagonal pyramid) is adopted in a three-blade drill.

Second Embodiment

A second embodiment of the present invention will be explained based on the accompanying drawings. Configurations that are the same as or equivalent to those of the first embodiment will be indicated by the same names and reference numerals, and explanation thereof will be omitted.

Figure 12:
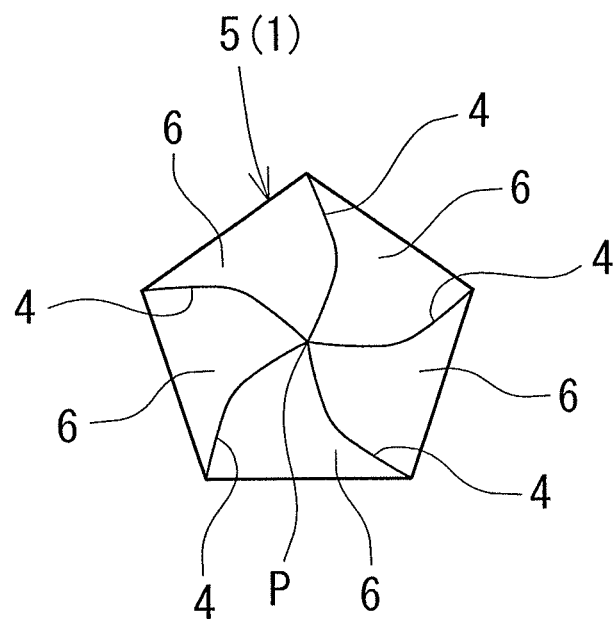
FIG. 12 is a view showing a pyramid according to a second embodiment and corresponding to FIG. 4 of the first embodiment.
Figure 13:
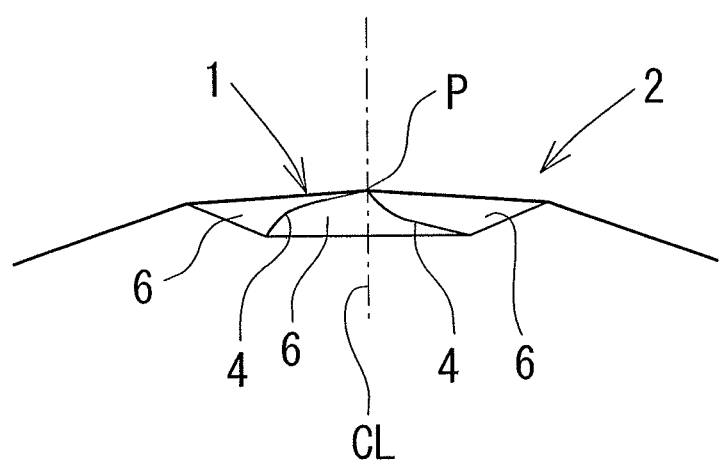
FIG. 13 is a view showing the pyramid according to the second embodiment and corresponding to FIG. 3 of the first embodiment.

As shown in FIG. 12 and FIG. 13, in a drill of the second embodiment, each edge 4 of a pyramid 1 is formed of a curved line, which is convex in a clockwise direction at its center, viewed along a line of sight in a direction of a center line of the drill CL (viewed perpendicularly to the paper surface of FIG. 12).

According to the second embodiment, since a contact length between each of the edges 4 of the pyramid 1 and a work piece during processing, in other words, a length of a cutting edge 7 (see FIG. 2) of the pyramid 1 is increased compared to a case where each of the edges 4 of the pyramid 1 is formed of a straight line (see FIG. 4), loads during processing are dispersed and sharpness of the cutting edge is improved, thereby inhibiting buckling of the tip end (the pyramid 1).

Third Embodiment

A third embodiment of the present invention will be explained based on the accompanying drawings. Configurations that are same as or equivalent to those of the first embodiment will be indicated by the same names and reference numerals, and explanation thereof will be omitted.

Figure 14:
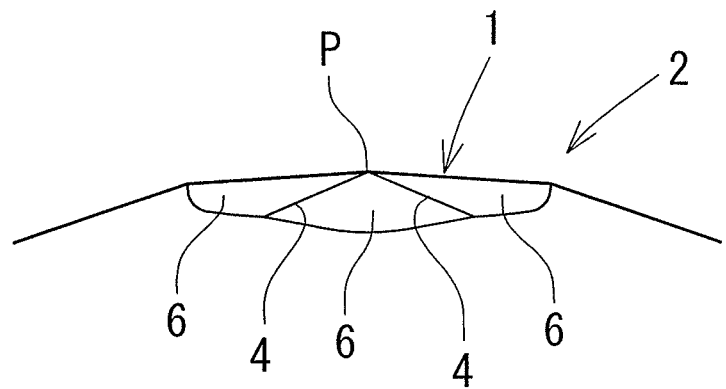
FIG. 14 is a view showing a pyramid according to a third embodiment and corresponding to FIG. 3 of the first embodiment.
Figure 15:
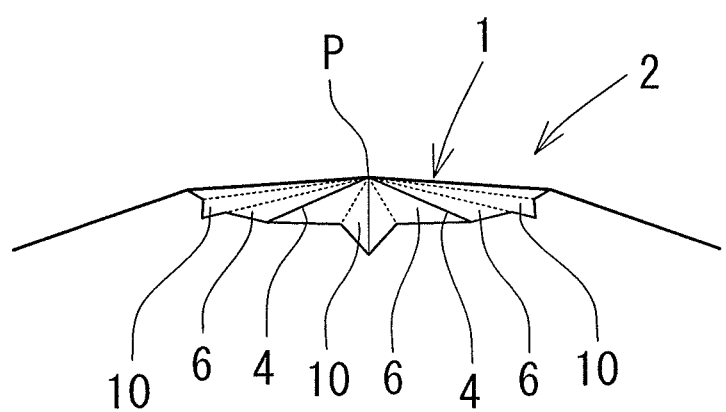
FIG. 15 is a view showing another embodiment of the pyramid of the third embodiment.

As shown in FIG. 14, in a drill of a third embodiment, each pyramid surface 6 of a pyramid 1 is formed of a concave-shaped curved surface, in contrast to the first embodiment shown in FIG. 3 in which each of the pyramid surfaces 6 of the pyramid 1 is formed of a flat surface.

According to the third embodiment, friction between each of the pyramid surfaces 6 of the pyramid 1 and a work piece during processing is reduced. Thus, an increase in cutting temperature due to friction is prevented, thereby preventing wear of the pyramid 1.

The concave shape is formed by configuring each of the pyramid surfaces 6 of the pyramid 1 with a curved surface, and may also be formed by providing a groove 10 in each of the pyramid surface 6 made of a flat surface (see FIG. 3), the groove 10 extending radially from the apex P and having a V-shaped sectional surface. In this case, the groove 10 may be formed so that a groove width thereof increases linearly from the apex P.

The invention claimed is:

1. A two-blade drill in which two flanks of a tip of the drill are re-ground by conical grinding, comprising:
   a pyramid in the tip of the drill placed between the two flanks so as to remove a chisel edge, in which an apex of the pyramid is located on a center line of the drill, and an inclination angle of each edge extending from the apex relative to the center line of the drill is larger than an angle that is one-half of a tip angle of the drill, wherein each pyramid surface of the pyramid is formed into a concave shape, and the number of edges extending of the apex of the pyramid is an odd number.

2. The drill according to claim 1, wherein each of the edges of the pyramid is formed of a curved line.

* * * * *